July 5, 1949. R. W. RICHARDS 2,474,958
APPARATUS FOR MAKING COLOR SEPARATION NEGATIVES
Filed Nov. 21, 1941 3 Sheets-Sheet 3
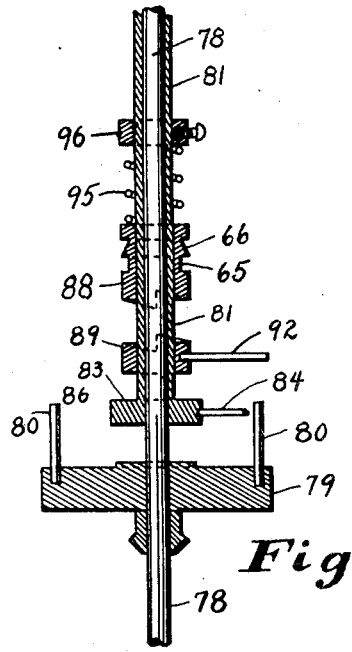
Fig. 3.
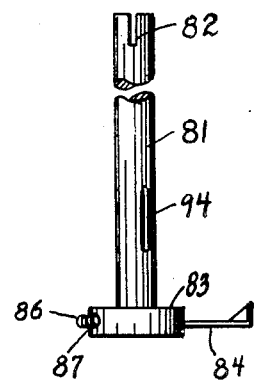
Fig. 4.
Fig. 6.
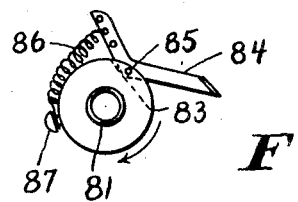
Fig. 5.
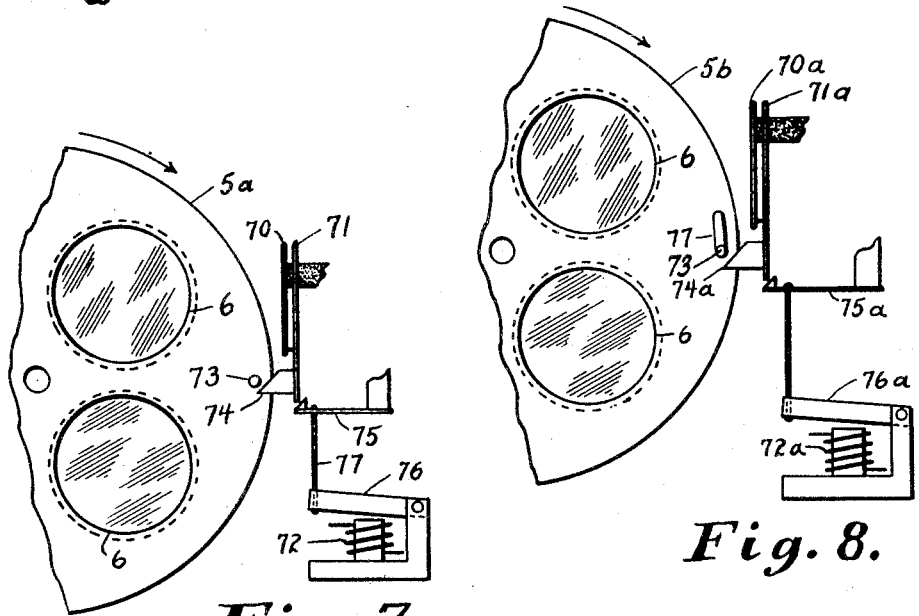
Fig. 7.
Fig. 8.
Inventor
Ralph W. Richards
By Paul A. Rose
Attorney Patented July 5, 1949

2,474,958

UNITED STATES PATENT OFFICE 2,474,958

APPARATUS FOR MAKING COLOR SEPARATION NEGATIVES

Ralph W. Richards, Washington, D. C.

Application November 21, 1941, Serial No. 420,023

5 Claims. (Cl. 88—24)

This invention relates to a photographic apparatus, and, more particularly, to an apparatus for making color separation negatives from color transparencies.

Another object of this invention is to provide a device of the type described in which color separation negatives are exposed according to a preselected schedule and with a minimum of manipulation required of the operator.

Another object of the invention is to provide in such an apparatus a plurality of automatic features assuring the production of uniform and properly exposed color separation negatives.

Another object of the invention is to provide an apparatus for the purpose set forth in which a camera of standard make may be used for making the color separation negatives.

A further object of the invention is to provide in the aforesaid apparatus means for illuminating the subject to be photographed in a manner to avoid changing diaphragm setting of the camera when subjects of varying densities are copied.

A further object of the invention is to provide an apparatus for making color separation negatives which is simple and substantially foolproof in operation.

Still further objects and advantages of the invention will appear in the following description taken in connection with the accompanying drawings in which:

Fig. 3 is a detailed view, in section, of the camera winding mechanism with parts displaced from operative positions;

Figs. 4, 5 and 6 are detailed views of parts of the camera winding clutch; and

Figs. 7 and 8 are views of an alternative construction of switches for operating the filter disc driving motor and the camera winding motor.

Figure 1:
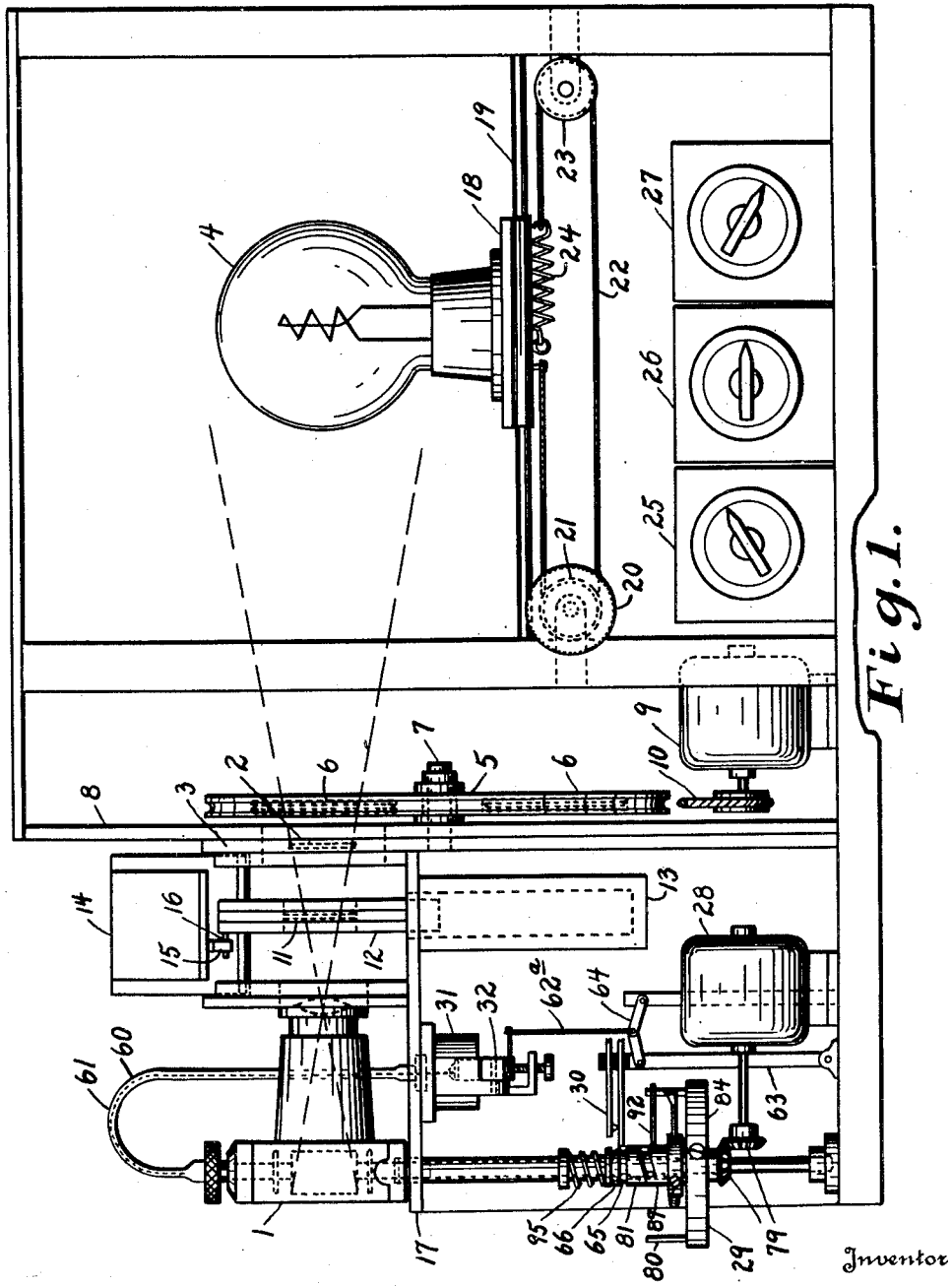
Fig. 1 is a side view of the apparatus with encasing members removed to reveal the interior of the apparatus.

Referring to Fig. 1 of the drawings, wherein the optical system of the apparatus best is illustrated, 1 is the camera for taking the color separation negatives of the color transparency 2 positioned in frame 3. The camera illustrated is a Leica camera using 35 mm. motion picture film and having a focal plane shutter that is automatically cocked as the film is advanced after exposure and is released upon depressing a release button to expose a new frame, but any suitable camera may be used. The transparency is illuminated by light from electric light bulb 4. A disc 5 carrying a plurality of color filters 6 is journalled for rotation on pivot 7 mounted on frame 8. The filter disc 5 is driven by electric motor 9 through belt 10.

The optical system includes a photosensitive element 11 fixed in frame 12 which is retracted into well 13 while exposures are being made. As shown in Fig. 1, element 11 is drawn up in alignment with the optical axis of the system in position to register the illumination passing through the transparency 2. The element is raised when the cover 14 is lifted, the hook 15 on the cover engaging the pin 16 on the frame of the photosensitive element. The photosensitive element is operatively connected to a suitable measuring instrument such as a microammeter (not shown) which may be mounted on panel 17.

The light source 4 is carried by a sliding carriage 18 mounted on rods 19 for movement parallel to the optical axis of the system. Movement is imparted to the carriage by turning handle 20 to rotate wheel 21 about which passes cable 22, which latter also passes around wheel 23 and is fixed to the carriage 18. Spring 24 serves to apply sufficient tension to the cable to prevent slipping on wheels 21 and 23.

25, 26 and 27 are timers of any desired type, preferably electric timers, which govern the time of exposure of each color separation negative according to a predetermined schedule which depends upon the characteristics of the photographic emulsion being used, the aperture of the camera, the intensity of illumination, etc.

28 is an electric motor for winding camera 1 by means of winding clutch 29 and automatic stop switch 30, to be described in detail hereinafter. 31 is a solenoid creating a magnetic field to actuate operating bar 32 to trip the camera shutter and to perform other functions later to be described.

Figure 2:
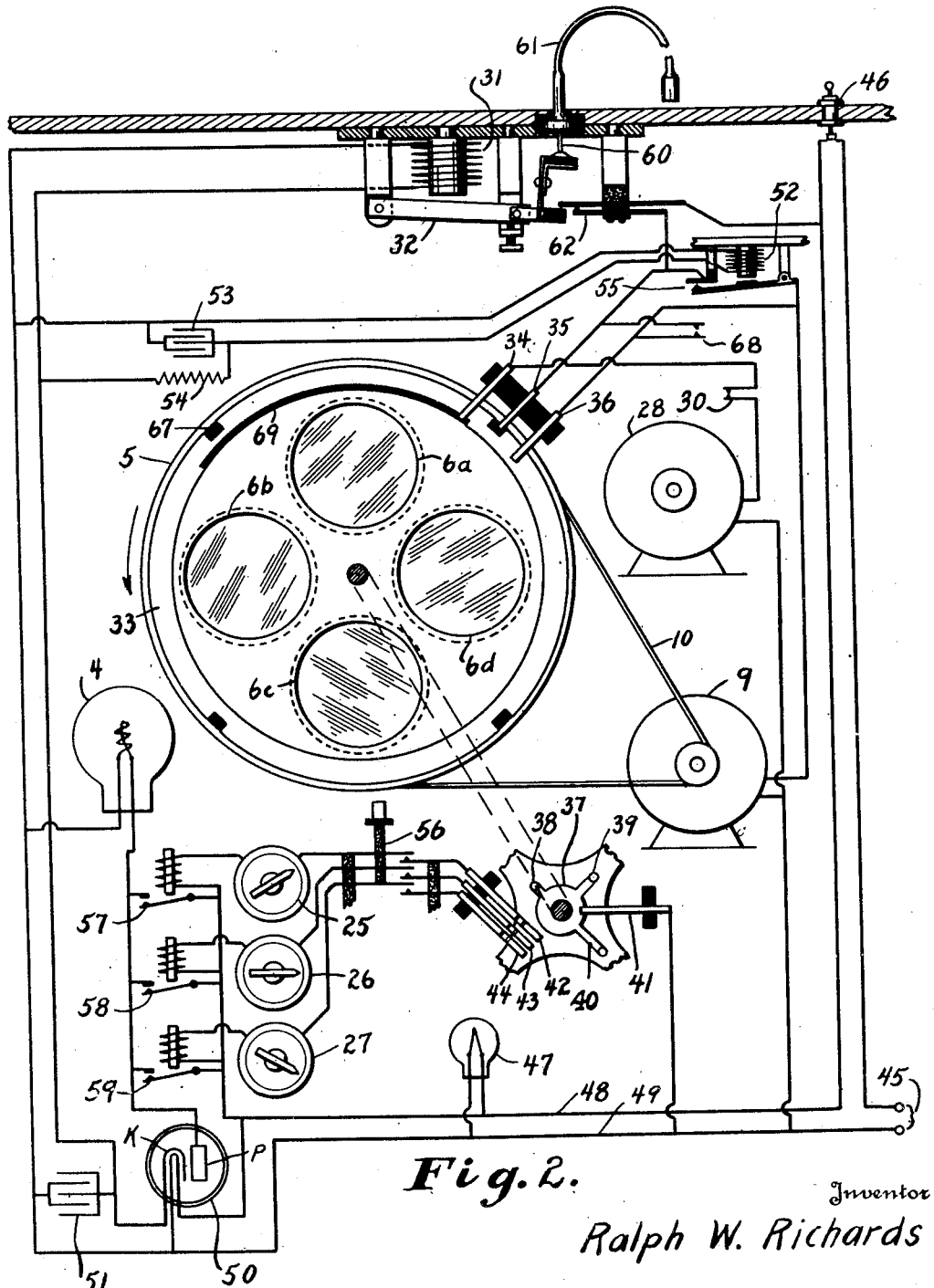
Fig. 2 is a diagrammatic showing of the electrical circuit of the device with several cooperating elements.

Before referring to Fig. 2 of the drawings, it will be well to describe what the apparatus of the invention is intended to do. According to many processes for producing color prints from color transparencies, such as positive transparencies, it is necessary to produce a plurality, preferably three, of black and white color separation negatives of the transparency. These negatives are exposed each through a different color filter. In the present instance three filters, red, green and blue, are used, the fourth opening of the filter disc being occupied by a clear filter or no filter at all. According to a preferred and well known process, a wash-off relief print is made from each color separation negative, and after appropriate dyeing of the wash-off relief prints a composite and final color print is made by successively printing in register upon a suitable backing impressions of the wash-off relief prints. The process is fraught with difficulties in that to produce a pleasing and colorimetrically accurate reproduction of a transparency, the color separation negatives must be properly exposed and must be of identical size and definition so that the enlarged or contact wash-off relief prints made therefrom will register accurately. The apparatus of the invention will produce such negatives.

Turning now to Fig. 2, filter disc 5, typically fabricated from a phenol-formaldehyde synthetic resin such as Bakelite or other insulating material, which rotates in the direction of the arrow, carries four filter elements; 6a is clear, 6b is blue, 6c is green, and 6d is red. The filter disc also carries contact ring 33 of conducting metal. Brushes 34, 35 and 36 bear upon ring 33 and cooperate therewith to energize motors 9 and 28. Commutator 37 also is carried by the filter disc but is shown displaced therefrom in the drawing for the sake of clarity. The commutator is provided with contact points 38, 39 and 40 which engage successively with brushes 42, 43 and 44 for selecting a timer 25, 26 or 27, according to which filter element is interposed in the optical axis of the apparatus. Brush 41 connects any of the contact points through commutator 37 with one side 49 of the electric power line 45.

Alternating current is supplied to the apparatus at terminals 45 from any suitable source (not shown). Main switch 46 is used to render the apparatus operative or inoperative as desired. A signal light 47 may be placed across the conductors 48 and 49 to indicate when the conductors are energized.

Vacuum tube rectifier 50 and condenser 51 constitute a source of direct current for the energization of solenoids 31 and 52. Condenser 53 and resistor 54 are included in the circuit of solenoid 52 and serve to delay the closing and opening of switch 55 for a purpose to be explained presently.

A three-pole operating switch 56 is provided which completes the operating circuit through the timers. Magnetic switches 57, 58 and 59 are operated and maintained closed for a predetermined period of time by the timers, and only one of these switches operates depending upon which filter element is positioned in the optical axis. These switches complete the circuit through light source 4 and through the rectifying unit to energize solenoids 31 and 52. Upon the energization of solenoid 31, operating arm 32 is raised. The arm performs three principal functions by this motion: (1) the camera shutter is opened by movement of wire 60 in flexible cable 61 which trips the shutter-opening mechanism; (2) switch 62 is opened by engagement of the free end of the arm with the free end of the upper switch element to separate the switch elements; and (3) (as shown in Fig. 1) switch 30 is closed by an upward movement of link 62a causing upright 63 to be rocked to the right, by the action of toggle link 64 which results in the disengagement of the lower element of switch 30 from recess 65 permitting the switch contacts to close under spring action of the switch elements.

The light source 4 being illuminated, the exposure appropriate to the filter element in operative position is made, the length of exposure being determined by the timer setting.

When operating switch 56 is closed, switch 55 closes under action of solenoid 52 thereby potentially completing the circuits to motors 9 and 28 which would operate except for the fact that switch 62 has been opened by the action of arm 32.

The action of arm 32 closes switch 30, which is in the line energizing camera winding motor 28, and would complete the circuit to cause winding of the camera but for the fact that the circuit is broken by the simultaneous opening of switch 62.

After the exposure has been made, the timer in operation de-energizes its switch 57, 58 or 59 thereby de-energizing light source 4 and the rectifier supplying direct current to solenoids 31 and 52. Operating arm 32 drops, closing the camera shutter through cable 61 thereby terminating the exposure, closing switch 62, and permitting the lower leaf of switch 30 to move by gravity to rest upon the conical surface 66 of the mechanism of camera winding clutch 29. Delay switch 55 does not open immediately upon de-energization of the rectifier but, due to the delay action of condenser 53, remains closed until a conducting portion of contact ring 33 has made contact with brush 35 due to rotation of the disc by motor 9.

The circuit to filter disc operating motor 9 is first completed through switches 62 and 55 to rotate the filter disc in a counter-clockwise direction. When switch 55 opens after its delay period, the current energizing motor 9 is maintained through the alternative circuit including switch 62, brushes 35 and 36 and contact ring 33. The motor 9 therefore continues to run, turning the filter disc to bring the next filter element into operative alignment in the optical axis of the system. When this position is reached, the motor 9 is stopped when its circuit is broken by a non-conducting spot 67 being brought under brush 35.

During rotation of the filter disc, the camera is wound. Camera winding motor switch 30 is closed, and the camera winding motor 28 starts when switch 62 closes by completion of the motor energizing circuit through these switches and through brushes 35 and 34 in engagement with contact ring 33. The motor operates to wind the camera preparatory to making the next exposure, and automatically stops when the camera is wound by the opening of switch 30, which occurs in a manner to be explained hereinafter in connection with the description of the winding clutch. The interval required to wind the camera is made less than the time required to rotate the filter disc one-quarter of a revolution so that the winding of the camera will be completed before the circuit to motor 28 can be interrupted by a non-conducting spot 67 contacting brush 35.

Rotation of the filter disc to its new position selects another timer through commutator 37. The exposure cycle is now ready to be repeated by simply closing operating switch 56.

Briefly reviewing the operation of the apparatus, the taking of an entire sequence of color separation negatives now will be described.

As shown in Fig. 2, the last exposure of a previous set of exposures has been made, and the apparatus is ready to make another set. The camera is unwound, the light source is off, the transparency is in position to be photographed, and the white filter element 6a is in operative position in the optical axis of the apparatus. The closing of switch 56 will affect nothing because none of the brushes 42, 43 or 44 are in register with a contact element of the commutator 37. This fact indicates to the operator that a previous set of exposures has been completed. The operator here inserts the next transparency to be photographed and adjusts the position of the light source, using photosensitive element 11 to insure that a preselected and constant intensity of illumination is passing through the transparency.

The red filter element 6d is brought into upper position by momentarily closing independent switch 68, thereby energizing motor 9 to rotate the filter disc in a counter-clockwise direction. When the circuit through brushes 35 and 36 is closed through the contact ring 33, the motor 9 will operate until it is automatically stopped by non-conducting spot 67 being brought under brush 35, and it is unnecessary to maintain switch 68 closed. The camera winding motor 28 also operates while the filter disc is rotating because brushes 34 and 35 simultaneously make contact with ring 33 to complete the circuit to the motor through closed switch 30.

Operating switch 56 next is closed, the circuit through the commutator 37 and brush 42 is completed and the minus-red separation negative is exposed by the light from light source 4 and the opening of the camera shutter. When the timer breaks switch 57, the light 4 is extinguished, the camera shutter is closed, the camera automatically is wound and the filter disc is rotated to bring the green filter element 6c into the upper position, all as previously described. The minus-green exposure next is made by again closing operating switch 56. The minus-blue exposure similarly is made. After making the minus-blue exposure, the apparatus has completed the cycle and again is in the condition shown in Fig. 2.

During the rotation of the filter disc to move the blue filter out of operating position and to move the clear filter into its place, camera winding motor 28 does not operate because non-conducting strip 69 on the filter disc contacts brush 34 thereby preventing completion of the motor energizing circuit. This is desired in order to avoid having the camera wound and ready to function when the clear filter is in the optical axis of the apparatus.

Fig. 7 shows a trip-switch which may be substituted for the time delay switch 55, the delay condenser 53 and resistor 54, the contact ring 33 and brushes 35 and 36. The poles 70 and 71 of the switch are connected in series with switch 62 and with the circuit energizing the filter disc motor 9. The solenoid 72 is connected to be energized when switch 56 is closed. Pin 73 on filter disc 5a is positioned to engage cam 74 which moves pole 71 to the right to break the switch and stop the motor when the filter element is in operative position. When the switch is thus opened, spring detent 75 engages the free end of pole 71 and prevents closing of the switch. The pin 73, meantime, passes beyond the bottom of cam 74. When the operating switch 56 is closed to make an exposure, coil 72 is energized, pulling down bar 76 which retracts detent 75 through link 77 thereby allowing switch 70—71 to close. But it will be remembered that switch 62 is opened upon closing the operating switch so that the filter disc operating motor will not function until switch 62 is closed after the exposure has been made.

Fig. 8 shows a trip switch for insertion in the circuit energizing the camera winding motor to prevent operation of the latter when changing from the blue to the white filter element. The parts are similar to the correspondingly numbered parts of the assembly shown in Fig. 7. The switch poles 70a and 71a are connected in series with the circuit energizing the camera winding motor 28 and in series with switches 30 and 62. Brush 34 is eliminated when the alternative trip switch is used. Pins 73 are positioned on the filter disc 5b to stop the camera winding motor by opening switch 70a—71a when a filter element rotates into operative position. But while the blue exposure is being made, a cam 77, mounted on the filter disc opens the switch 70a—71a. Upon closing the operating switch 56 momentarily to start the blue exposure, the spring detent 75a will be retracted as usual, but due to the fact that the cam 77 still engages the cam 74a, switch 70a—71a will not close. When operating switch 56 is released, after the starting of the blue exposure, spring detent 75a returns to normal position and re-engages the lower end of switch element 74a. Thus when the filter disc is rotated to bring up the clear filter, switch 70a—71a remains open and the camera is not wound. The circumferential dimension of cam 77 is such that it will not rotate past the cam 74a when the filter disc motor is automatically stopped.

The automatic trip switches shown in Figs. 7 and 8 preferably are both used together, being substituted for the elements of Figs. 1 and 2 performing the corresponding functions. When so used, the switch of Fig. 8 is positioned underlying the switch of Fig. 7.

The camera winding clutch and motor cut-off will now be described in detail with reference to Figs. 1 and 3 to 6. The function of the drive is to wind the camera which requires, in this case, slightly more than one revolution of the winding mechanism. When the camera is completely wound, the clutch becomes disengaged so that no damaging torque is applied to the camera and the motor is automatically switched off.

The shutter of the camera which is illustrated will not function properly if any forward torque is maintained on its winding mechanism, and the present clutch relieves the winding mechanism of such unwanted torque during the picture-taking operation.

Referring more particularly to Fig. 3, 78 is a vertical shaft which is driven by motor 28 through bevel gears 79. Shaft 78 carries a driving disc 79 rigidly mounted thereon. The disc is provided with two rigid upstanding pins 80. The part of shaft 78 extending above disc 79 acts as an idler shaft and is not connected with the camera winder, but serves primarily to carry the driven elements of the clutch. Slipped over shaft 78, and mounted for free rotation thereon, is the driven element shown independently in Fig. 4. Sleeve 81 is provided with a slot 82 for driving engagement with the camera winder. Rigidly fixed to the bottom of the sleeve is a driven disc 83 provided with bell-crank 84 pivoted at 85. The free end of the bell-crank is urged outwardly by spring 86 secured between the other end of the bell-crank and the driven disc at 87. The tension of spring 86 may be varied as desired to determine the torque above which the clutch will slip.

Considering for a moment only the elements heretofore described, it will be apparent that, with the clutch rotating in a clockwise direction looking down, shaft 78 drives driving disc 79.

One of the pins 80 engages the free end of bell-crank 84 to rotate the driven disc 83 and sleeve 81 with shaft 78. When the camera has been wound, the back torque through the clutch is increased until a preselected value is exceeded at which the bell-crank 84 slips past pin 80 against the tension of spring 86, and the driving torque through the clutch is thus removed. Were the motor 28 permitted to continue running, the free end of the bell-crank would continue to engage and slip past the pins 80 as driving disc 79 continued to rotate.

However, this situation is avoided by automatically switching off the motor by means of the motor cut-off feature now to be described. As shown in Fig. 6, a sleeve 88—89, having a bore 90 of a diameter to fit loosely over sleeve 81 for rotation or lateral movement thereon, is cut into two parts 88 and 89 along line 91 thereby providing cooperating cam surfaces 91. Lower part 89 is provided with a pin 92 and is placed on shaft 81 for free rotation thereon. The bottom of part 89 rests upon the top of driven disc 83 and pin 92 is engaged by one of the pins 80 on the driving disc. Upper part 88 is provided with a key 93 which engages a vertical keyway 94 in sleeve 81 permitting vertical movement, but restraining rotational movement, of part 88 with respect to the sleeve 81. A compression spring 95, working against collar 96 on sleeve 81, biases the upper part 88 against the lower part 89. It will be apparent that when lower part 89 is rotated clockwise, looking down, upon shaft 81, the cam surfaces 91 cooperate to gradually raise the upper part 88 to the limit of the cam shoulders and thereafter the spring 95 causes a quick return of part 88 to its lower position. This quick return is the motion which is transmitted to switch 30 to effect a quick opening thereof.

After the camera is tightly wound, pin 80 begins to slip past the bell-crank 84 but carries with it pin 92 causing rotation of the lower part 89 with respect to the upper part 88 and resulting in the gradual lifting of the upper part. Groove 65 in the upper part engages the free end of the lower pole of switch 30 just before the upper part reaches the limit of its rise. The conical surface 66 of the upper part rides over the end of the lower switch pole, which latter is forced into groove 65 under the extending action of toggle 64 as already explained. As soon as the cam surfaces 91 ride over their respective peaks, a sudden downward movement is imparted to the upper part 88 by spring 95 resulting in the quick opening of switch 30 and the stopping of motor 28.

The invention is not limited to a winding clutch and motor cut-off of the specific construction herein disclosed, but any device which will serve a similar purpose may be used instead.

The camera disclosed preferably is one in which a single winding motion serves to transport the film to a position for taking a new exposure and to wind the shutter actuating mechanism. Of course, any camera having similar characteristics may be used in place of the camera disclosed, and the apparatus of the invention may be adapted by one skilled in the art to accommodate any camera.

The hereinbefore described specific apparatus is intended to be merely illustrative and not limitative of the invention as defined in the following claims.

I claim:

1. In an apparatus for making color separation negatives and the like including means for mounting a transparency to be photographed, means for positioning a camera to photograph said transparency and a light filter system including a plurality of filter elements for selectively interposing a filter element in the optical axis of the apparatus, a magnetic operating device and controlled means for energizing the same for predetermined and selective durations of time and means for connecting said magnetic device to operate the camera shutter, motive means for said filter system for successively moving the filter elements thereof into the optical axis of the apparatus, said controlled means for energizing said magnetic operating device being associated with said filter system for selecting a period of operation of the magnetic device which is appropriate to the filter element in the optical axis of the apparatus and means associated with said filter system and with said magnetic operating device for deenergizing said filter system motive means to maintain a filter element in the optical axis of the apparatus while the camera shutter is operating and, after the termination of the operation of the camera shutter, for energizing said filter system motive means to move said filter element out of said optical axis and to move a succeeding filter element into said optical axis.

2. An apparatus as defined in claim 1 in which motive means is provided for winding the camera after the termination of the operation of the camera shutter.

3. Apparatus for making color separation negatives and the like comprising means for mounting a transparency to be photographed, means for mounting a camera for photographing said transparency, a filter disc, including a plurality of light filter elements, pivotally mounted to permit successive interposition of the filter elements in the optical axis of the apparatus, an electric motor and energizing circuit therefor for rotating said filter disc, a plurality of timing devices and circuit means for selectively energizing said timing devices in accordance with which filter element is in said optical axis, a magnetic operating device and means for connecting said device to operate the camera shutter, the energized timing device controlling the duration of operation of said magnetic device, and means associated with said filter disc and with said magnetic device for de-energizing said filter disc motor to maintain a filter element in said optical axis during operation of said camera shutter and, after the termination of the operation of said camera shutter, for energizing said motor to rotate said filter disc for interposing a successive filter element in said optical axis.

4. An apparatus as defined in claim 3 in which a motor is provided for winding the camera after the termination of the operation of the camera shutter.

5. Apparatus for making color separation negatives and the like comprising means for mounting a transparency to be photographed, means for mounting a camera for photographing said transparency, a filter disc, including a plurality of light filter elements, pivotally mounted to permit successive interposition of the filter elements in the optical axis of the apparatus, an electric motor and energizing circuit therefor for rotating said filter disc, a plurality of timing devices and circuit means for selectively energizing said timing devices in accordance with which filter element is in said optical axis, a camera shutter operating device and means for connecting said device to operate the camera shutter, the energized timing device controlling the duration of operation of said camera shutter operating device, and means associated with said filter disc and with said camera shutter operating device for de-energizing said filter disc motor to maintain a filter element in said optical axis during operation of said camera shutter and, after the termination of the operation of said camera shutter, for energizing said motor to rotate said filter disc for interposing a successive filter element in said optical axis.

RALPH W. RICHARDS.

REFERENCES CITED

The following references are of record in the file of this patent:

UNITED STATES PATENTS

| Number | Name | Date |
|---|---|---|
| 1,270,269 | Davis | June 25, 1918 |
| 2,050,552 | Baker | Aug. 11, 1936 |
| 2,061,192 | Gaty | Nov. 17, 1936 |

FOREIGN PATENTS

| Number | Country | Date |
|---|---|---|
| 834,678 | France | Aug. 29, 1938 |
| 499,054 | Great Britain | Jan. 18, 1939 |
| 540,933 | Great Britain | Nov. 5, 1941 |

OTHER REFERENCES

Photo-Technique, October 1941, Article on Copying Kodachrome by Morris Colman, pages 30 to 33, inclusive.